US007601060B2

(12) United States Patent
Baerlocher et al.

(10) Patent No.: US 7,601,060 B2
(45) Date of Patent: *Oct. 13, 2009

(54) METHOD OF OPERATING A PROGRESSIVE GAMING DEVICE

(75) Inventors: Anthony J. Baerlocher, Reno, NV (US); Paulina Glavich, Reno, NV (US)

(73) Assignee: IGT, Reno, NV (US)

( * ) Notice: Subject to any disclaimer, the term of this patent is extended or adjusted under 35 U.S.C. 154(b) by 966 days.

This patent is subject to a terminal disclaimer.

(21) Appl. No.: 10/463,503

(22) Filed: Jun. 17, 2003

(65) Prior Publication Data

US 2003/0216166 A1 Nov. 20, 2003

Related U.S. Application Data

(63) Continuation of application No. 09/966,694, filed on Sep. 28, 2001, now Pat. No. 6,599,193.

(51) Int. Cl.
*A63F 13/00* (2006.01)

(52) U.S. Cl. .......................... 463/20; 463/16; 463/31; 463/22

(58) Field of Classification Search .................. 463/20, 463/16, 40, 42
See application file for complete search history.

(56) References Cited

U.S. PATENT DOCUMENTS

| | | | |
|---|---|---|---|
| 4,775,155 | A | 10/1988 | Lees |
| 4,991,848 | A | 2/1991 | Greenwood et al. |
| 5,116,055 | A | 5/1992 | Tracy |
| 5,275,400 | A | 1/1994 | Weingardt et al. |
| 5,280,909 | A | 1/1994 | Tracy |
| 5,342,047 | A | 8/1994 | Heidel et al. |
| 5,344,144 | A | 9/1994 | Canon |
| 5,393,057 | A | 2/1995 | Marnell, II |
| 5,476,259 | A | 12/1995 | Weingardt |
| 5,536,016 | A | 7/1996 | Thompson |
| 5,611,730 | A | 3/1997 | Weiss |
| 5,645,486 | A | 7/1997 | Nagao et al. |

(Continued)

FOREIGN PATENT DOCUMENTS

| | | |
|---|---|---|
| AU | 562469 | 6/1987 |

(Continued)

OTHER PUBLICATIONS

Bonus Spin Diamond Fives Advertisement written by IGT, published in 1999.

(Continued)

*Primary Examiner*—Ronald Laneau
*Assistant Examiner*—Ross A. Williams
(74) *Attorney, Agent, or Firm*—K&L Gates LLP

(57) ABSTRACT

A method of operating a gaming device which displays at least a set and preferably a plurality of sets of symbols on a display device. The base game, be it slot, poker, keno or blackjack, includes means, connected to the processor, for generating the symbols. Upon generating one of the symbols, the game provides an award associated with the generated symbol. Upon generating the set of symbols, the game provides a progressive award, wherein the progressive award includes at least one award and preferably each of the awards associated with the symbols of the completed set.

97 Claims, 12 Drawing Sheets

U.S. PATENT DOCUMENTS

| | | | | |
|---|---|---|---|---|
| 5,647,798 | A | | 7/1997 | Falciglia |
| 5,720,483 | A | | 2/1998 | Trinh |
| 5,788,573 | A | | 8/1998 | Baerlocher et al. |
| 5,833,537 | A | | 11/1998 | Barrie |
| 5,851,148 | A | | 12/1998 | Brune et al. |
| 5,855,515 | A | | 1/1999 | Pease et al. |
| 5,882,261 | A | | 3/1999 | Adams |
| 5,902,184 | A | | 5/1999 | Bennett |
| 5,947,820 | A | | 9/1999 | Morro et al. |
| 5,980,384 | A | | 11/1999 | Barrie |
| 5,997,400 | A | | 12/1999 | Seelig et al. |
| 5,997,401 | A | | 12/1999 | Crawford |
| 6,004,207 | A | | 12/1999 | Wilson, Jr. et al. |
| 6,012,982 | A | * | 1/2000 | Piechowiak et al. ........... 463/16 |
| 6,015,346 | A | | 1/2000 | Bennett |
| 6,056,642 | A | | 5/2000 | Bennett |
| 6,059,289 | A | | 5/2000 | Vancura |
| 6,062,981 | A | | 5/2000 | Luciano, Jr. |
| 6,089,978 | A | | 7/2000 | Adams |
| 6,110,043 | A | | 8/2000 | Olsen |
| 6,146,273 | A | | 11/2000 | Olsen |
| 6,155,925 | A | | 12/2000 | Giobbi et al. |
| 6,159,098 | A | | 12/2000 | Slomiany et al. |
| 6,162,121 | A | | 12/2000 | Morro et al. |
| 6,168,520 | B1 | | 1/2001 | Baerlocher et al. |
| 6,203,010 | B1 | | 3/2001 | Jorasch et al. |
| 6,224,482 | B1 | | 5/2001 | Bennett |
| 6,224,484 | B1 | | 5/2001 | Okuda et al. |
| 6,227,969 | B1 | * | 5/2001 | Yoseloff ...................... 463/13 |
| 6,234,897 | B1 | | 5/2001 | Frohm et al. |
| 6,309,298 | B1 | | 10/2001 | Gerow |
| 6,311,976 | B1 | | 11/2001 | Yoseloff et al. |
| 6,312,334 | B1 | | 11/2001 | Yoseloff |
| 6,334,814 | B1 | | 1/2002 | Adams |
| 6,346,043 | B1 | * | 2/2002 | Colin et al. ................... 463/17 |
| 6,386,977 | B1 | | 5/2002 | Hole |
| 6,398,218 | B1 | | 6/2002 | Vancura |
| 6,419,583 | B1 | | 7/2002 | Crumby et al. |
| 6,428,412 | B1 | | 8/2002 | Anderson et al. |
| 6,454,651 | B1 | | 9/2002 | Yoseloff |
| 6,461,241 | B1 | | 10/2002 | Webb et al. |
| 6,471,591 | B1 | | 10/2002 | Crumby |
| 6,481,713 | B2 | | 11/2002 | Perrie et al. |
| 6,537,150 | B1 | | 3/2003 | Luciano et al. |
| 6,565,434 | B1 | * | 5/2003 | Acres .......................... 463/25 |
| 6,599,193 | B2 | * | 7/2003 | Baerlocher et al. ............ 463/27 |
| 6,609,973 | B1 | | 8/2003 | Weiss |
| 6,609,975 | B1 | | 8/2003 | Sawyer et al. |
| 6,857,958 | B2 | * | 2/2005 | Osawa ......................... 463/20 |
| 2003/0045350 | A1 | | 3/2003 | Baerlocher et al. |
| 2003/0181231 | A1 | | 9/2003 | Vancura et al. |
| 2003/0211884 | A1 | | 11/2003 | Gauselmann |
| 2003/0236116 | A1 | | 12/2003 | Marks et al. |
| 2004/0048644 | A1 | | 3/2004 | Gerrard et al. |
| 2004/0219962 | A1 | | 11/2004 | Vancura |
| 2005/0119047 | A1 | | 6/2005 | Olive |
| 2005/0143168 | A1 | | 6/2005 | Torango |
| 2005/0176488 | A1 | | 8/2005 | Olive |
| 2005/0209004 | A1 | | 9/2005 | Torango |
| 2005/0239542 | A1 | | 10/2005 | Olsen |
| 2006/0003829 | A1 | | 1/2006 | Thomas |
| 2006/0025210 | A1 | | 2/2006 | Johnson |
| 2006/0035694 | A1 | | 2/2006 | Fuller |

FOREIGN PATENT DOCUMENTS

| | | |
|---|---|---|
| AU | 656302 | 1/1995 |
| AU | 711501 | 10/1999 |
| EP | 0 919 965 | 2/1999 |
| GB | 2 137 392 | 10/1984 |
| WO | WO 00/12186 | 3/2000 |
| WO | 2005076193 | 2/2005 |
| WO | 2005113093 | 5/2005 |
| WO | WO 2005/083599 A1 | 9/2005 |
| WO | WO 2005/099425 A2 | 10/2005 |

OTHER PUBLICATIONS

Bonus Spin Red, White and Blue Advertisement, written by IGT, published in 2000.
Cash Express Advertisements, written by Aristocrat, published in 2002.
Full House Advertisement, written by Anchor Games, published in 2000.
Jackpot Carnival Hyperlink Advertisement, written by Aristocrat, published prior to 2002.
Cash Box Advertisement written by Strictly Slots (Anchor Games/IGT), published in 2000.
Super 8 Race Advertisement written by IGT, published prior to 2001.
Super Cherry Advertisement written by IGT, published in 2001.
Boom Advertisements written by WMS Gaming, Inc., published in 1998.
Bingo Advertisement and Jackpot Bingo Advertisement written by Casino Data Systems, published in 1998 and 2001.
Five Card Instant Bingo Advertisement written by IGT, published in 2000.
Slot Line Mega Jackpots™ Advertisement written by IGT, published in 1997.
Clue Advertisement written by Mikohn, available in 2001.
Believe it or Not Article written by Strictly Slots, published in 2001.
Gold Fever Advertisement and Game Description written Casino Data System, published in 1997.
Vision Series Temperature Rising Advertisement written by IGT, published in 1999.
Slot Line Temperature Rising Game Description written by IGT, published in 1998.
Vision Series Build a Bonus Advertisement written by IGT, published in 1998.
Slot Line Progressive Advertisement written by IGT, published in 1993.
Slot Line Progressive Advertisement written by IGT, published in 1994.
Slot Line Progressive Advertisement written by IGT, published in 1995.
Slot Line Progressive Mega Jackpots Advertisement written by IGT, published in 1997.
Jewel in the Crown Advertisement written by IGT, published in 2000.
Vision Series Good Times Advertisement written by IGT, published in 1999.
Vision Series Double Diamond Advertisement written by IGT, published prior to 2001.
Bonus Spin Red, White & Blue Advertisement written by IGT, published prior to 2000.
Double Spin Five Times Pay Advertisement written by IGT, published prior to 2000.

* cited by examiner

FIG.6A 160, 112

| |
|---|
| A |
| B |
| C |
| D |
| E |
| F |
| G |
| H |
| I |
| J |
| K |
| L |
| M |
| N |
| O |

FIG.6B 162, 112, 164

| | |
|---|---|
| A | 5% |
| B | 5% |
| C | 5% |
| D | 5% |
| E | 10% |
| F | 5% |
| G | 5% |
| H | 10% |
| I | 5% |
| J | 10% |
| K | 5% |
| L | 10% |
| M | 5% |
| N | 5% |
| O | 10% |

FIG.6C 166, 112, 168

| |
|---|
| A |
| B |
| C |
| D |
| E |
| F |
| G |
| H |
| I |
| J |
| K |
| L |
| M |
| N |
| O |
| P |
| Q |
| R |
| S |

FIG.7

170, 172, 164

| | |
|---|---|
| 15 | 5% |
| 10 | 10% |
| 8 | 10% |
| 5 | 15% |
| 4 | 25% |
| 3 | 25% |
| 2 | 10% |

FIG. 9

180

182

| 182a | 182b | 182c | 182d | 182e |
| --- | --- | --- | --- | --- |
| BASE GAME | BASE GAME RANDOM GENERATION DEVICE | EVENT TRIGGERING PRIZE CRITERION | REQUIREMENT GENERATION DEVICE | REQUIREMENT |
| SLOT | SPINNING REELS | SYMBOL COMBINATION | GENERATING OR CHANGING A SYMBOL | SYMBOL ON REEL |
| POKER | CARD DEALING DEVICE | TWO JACKS OR BETTER | DEALING OR CHANGING A CARD | CARD AND SUIT |
| BLACK JACK | CARD DEALING DEVICE | BUST | DEALING OR CHANGING A CARD | CARD AND SUIT |
| KERO | NUMBER GENERATING DEVICE | NUMBER IN RANGE | GENERATING OR CHANGING A NUMBER | NUMBER |

METHOD OF OPERATING A PROGRESSIVE GAMING DEVICE

PRIORITY CLAIM

This application is a continuation of and claims the benefit of U.S. patent application Ser. No. 09/966,694, filed Sep. 28, 2001, now U.S. Pat. No. 6,599,193 entitled, "PROGRESSIVE GAMING DEVICE".

CROSS-REFERENCES TO RELATED APPLICATIONS

This application relates to the following co-pending commonly owned applications: "GAMING DEVICE HAVING A PRIMARY GAME SCHEME INVOLVING A SYMBOL GENERATOR AND SECONDARY AWARD TRIGGERING GAMES," Ser. No. 09/689,495, now U.S. Pat. No. 6,461,241, "GAMING DEVICE HAVING A PRIMARY GAME SCHEME INVOLVING A SYMBOL GENERATOR AND SECONDARY AWARD TRIGGERING GAMES," Ser. No. 10/174,789 Jun. 19, 2002, "GAMING DEVICE HAVING A PRIMARY GAME SCHEME INVOLVING A SYMBOL GENERATOR AND SECONDARY AWARD TRIGGERING GAMES," Ser. No. 10/174,790.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a relatively higher success rate progressive gaming device which enables a player to build potential awards as game play continues and which enables the player to realize the potential awards relatively frequently.

BACKGROUND OF THE INVENTION

Progressive gaming machines have become very popular. Known progressive slot machines contain jackpots that increase every time a player plays the slot machine. An individual progressive slot machine has a self contained jackpot, wherein the jackpot grows with every play. A linked progressive includes two or more slot machines connected to a common jackpot, each of which individually contribute to the jackpot. The machines usually take a percentage of the player's bet, such as 10%, and add it to the jackpot. The jackpots can reach sizeable amounts such as $1 million before a player hits or wins the jackpot. Such sizeable jackpots are very attractive to players. Furthermore, as the jackpot grows, so does overall payout percentage of the game.

Regardless of the type of progressive, known games typically require the player to play the maximum bet to be eligible to win the progressive jackpot. Even on a single payline dollar machine, the maximum bet can be $5 (max bet on most slot machines is 5 credits per payline). Many players who are not willing to wager such an amount, or consistently willing to wager such an amount, are thus excluded from having an opportunity to win the progressive jackpot and enjoy its associated payout increase. A known progressive slot machine that requires a max bet to enable the player to win a jackpot is a Megabucks® game by IGT, the assignee of the present invention.

Another known progressive slot machine is disclosed in U.S. Pat. No. 5,947,820 (hereafter "the '820 patent"), which issued on Aug. 4, 1998, and which is also assigned to IGT. The '820 patent discloses that the jackpot can be preset to an amount more than any other progressive award of the associated game. Preferably, however, the top award jackpot is a progressive value that increases as a function of each coin deposited in the machine. The '820 patent discloses that the player wins the progressive jackpot by successfully entering a bonus game and successfully playing the bonus game.

The '820 patent also discloses a secondary progressive game, wherein the player obtains letters of a phrase or pieces of a puzzle by randomly generating letter or puzzle piece outcomes. As the player accumulates letters or pieces, the game accumulates a bonus value. If the player completes the phrase or puzzle, the game enables the player to play a second bonus game. In the secondary bonus game, the game designates the number of picks that the player has from a progressive award pool based on the bonus value, e.g., one pick if the bonus value is less than 2000 credits, two picks if the bonus value is between 2000 and 2999, etc.

The secondary game is progressive because if the player walks away from the game before completing the phrase or puzzle, the game, rather than resetting the phrase or puzzle to an initial state, enables the next player to finish the uncompleted phrase or puzzle. The next player also inherits any accumulated bonus value.

Both the jackpot progressive and the secondary game enable a player to build potential awards as game play continues, although the secondary game enables the player to realize the potential awards much more frequently than does the jackpot progressive. The jackpot progressive has a very low success or hit rate and is typically a very high return game. Both types of games and more particularly the secondary game enable the player to supplement wins or offset losses experienced in the base game of the gaming device. In either case, players enjoy progressive and potential award building type games because they add variety to the gaming experience. A need therefore exists to provide a higher success or hit rate progressive gaming device, which enables a player to build potential awards as game play continues, and which enables the player to realize the potential awards relatively frequently.

SUMMARY OF THE INVENTION

The gaming device of the present invention provides a set and preferably a plurality of sets of symbols. The base game, be it slot, poker, keno, blackjack or another game randomly generates the symbols during regular base game play. The present invention also preferably includes a value database. A value is associated with each symbol. The association may be predetermined or randomly determined. The value database may alternatively be weighted such that at least one value is more likely to be randomly generated than at least one other value.

Upon generating a complete set of symbols, the game provides a progressive award associated with said set to the player. The progressive award includes at least one of the values and preferably each of the values associated with the symbols of the completed set. The progressive award is most preferably an addition of each of the values for the symbols of the completed set.

The present invention preferably includes a plurality of sets of symbols and a plurality of well known random generation devices for generating the symbols for each set. The random generation devices may include, for example, at least one slot machine reel having a plurality of symbols, a deck of cards or a set of keno numbers.

In one slot machine embodiment, one or more reels include at least one changeable symbol that morphs or changes into one of a plurality of the symbols upon the base game generation of a preset combination of symbols along a payline. In a poker embodiment, the game generates a card upon the base game generation of a preset card combination. In a blackjack embodiment, the game generates a card upon the base game generation of a preset blackjack outcome. In a keno embodiment, the game generates a number upon the base game generation of a preset keno outcome.

The base game generates base game awards as the player plays the game. The player also wins or generates the symbols of the different symbol sets as the player plays the base game. The present invention preferably awards the progressive award of the first completed set of symbols and resets or initializes the completed set or alternatively each of the sets upon the award of the progressive award.

The present invention includes a progressive game, such that a player can generate one symbol and associated value for a set, while the player plays a first game of the present invention. If the player ends the game without completing the set, the player does not win the progressive award. The same or different player can then begin a new game, wherein the new game maintains the previously generated symbol and associated values and can thereafter generate another symbol and value for the set. A third, fourth or fifth game, etc., can accrue symbols and values therefor, whereby the game eventually provides the progressive award, which preferably includes a combination of the values for the symbols, to the player who is playing when the game completes the set.

The progressive game preferably includes a plurality of the symbol sets. Different games of the present invention likely generate symbols and values for different sets. The player who is playing when the game completes the first symbol set wins the progressive award associated with that set.

It is therefore an advantage of the present invention to provide a progressive gaming device having a base game that generates symbols of a plurality of sets of symbols and provides a progressive award in addition to base game awards upon the first fulfillment of a set of symbols.

It is another advantage to provide a gaming device that generates values in association with generating symbols.

It is a further advantage to provide a progressive game that may be implemented with any primary game such as slot, poker, keno and blackjack.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 6A through 6C are schematic diagrams of symbol pools for the slot machine embodiment of FIG. 5, illustrating symbols that the base game of the slot machine generates to complete the symbol sets;

FIG. 7 is a schematic diagram of a value database illustrating the values and their likelihood of being selected;

FIG. 9 is a schematic table listing different base games each having a base game random generation device, an event that generates symbols, a symbol generation device of the base game and the symbols.

DETAILED DESCRIPTION OF THE INVENTION

Gaming Device and Electronics

Figure 1A:
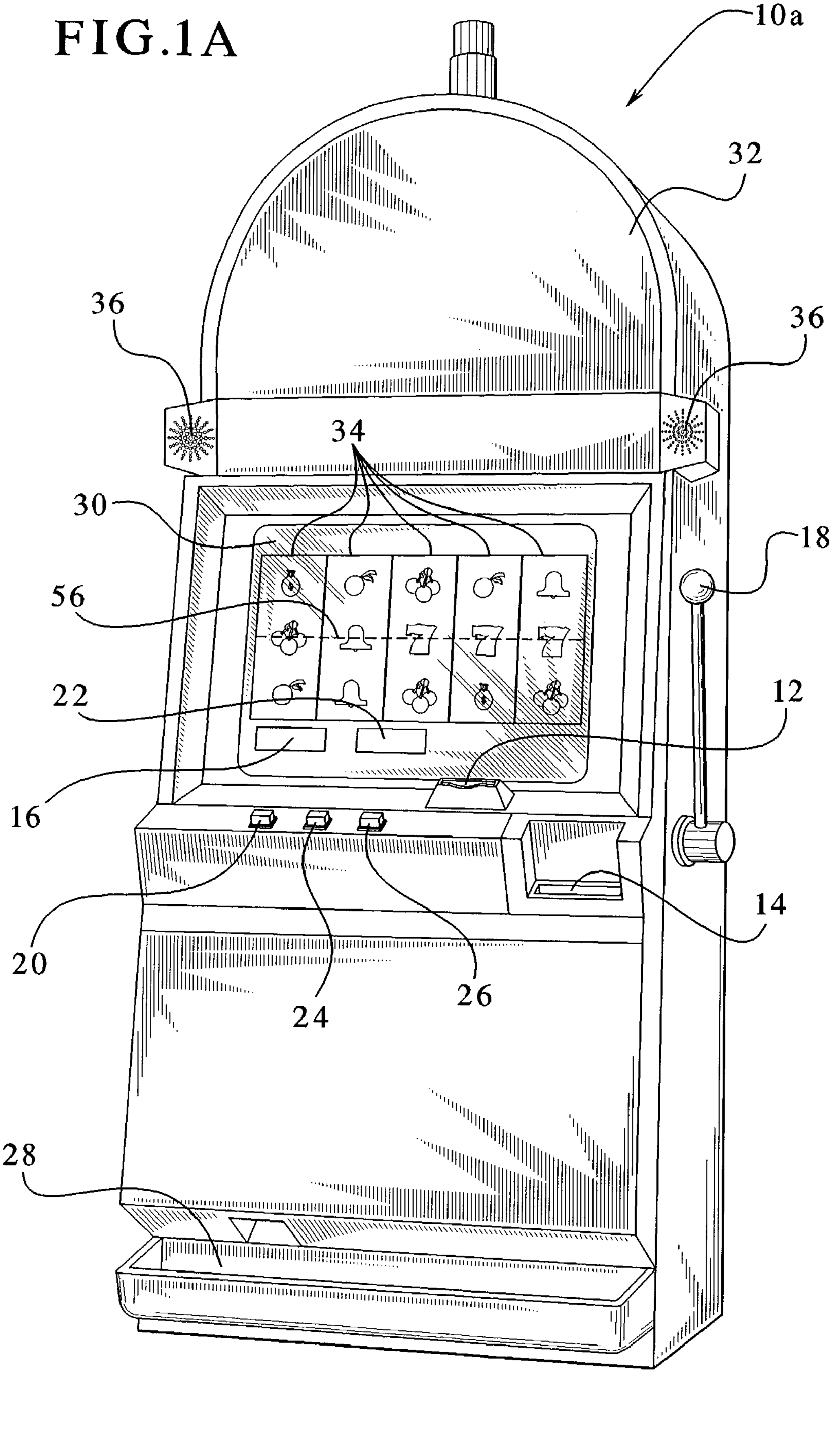
FIG. 1A is a front-right side perspective view of one embodiment of the gaming device of the present invention.
Figure 1B:
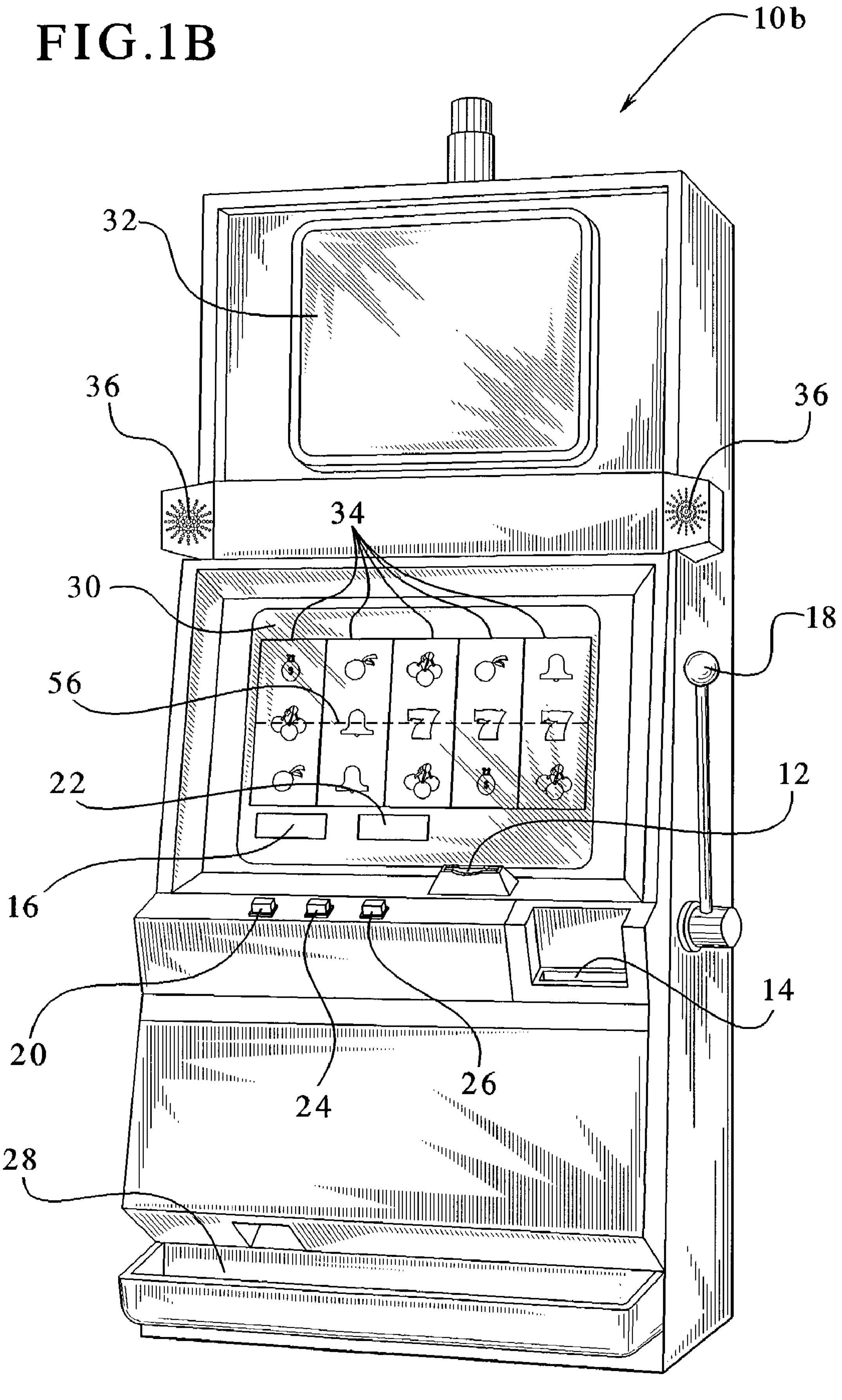
FIG. 1B is a front-right side perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
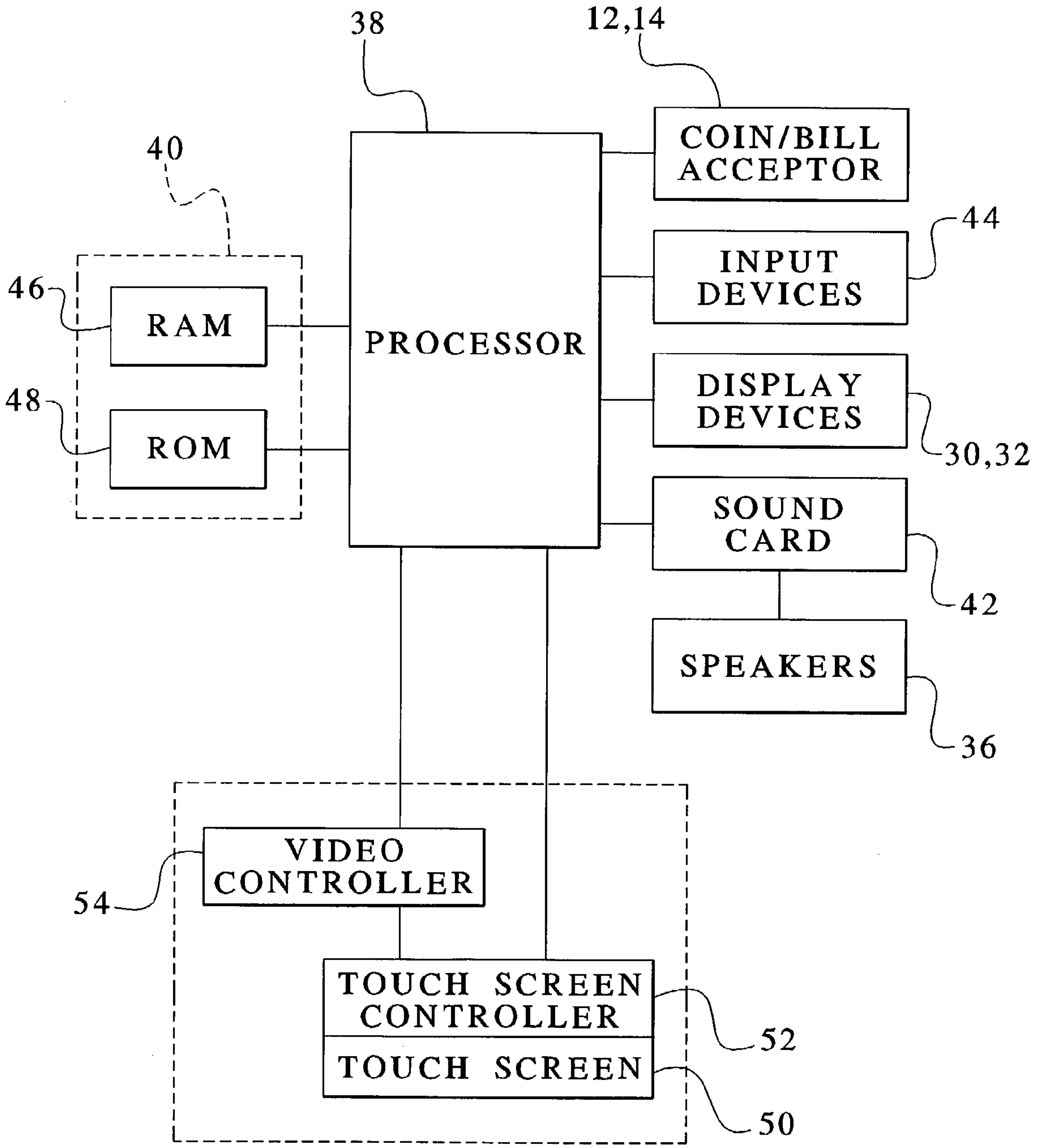
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

General Embodiment

Figure 3:
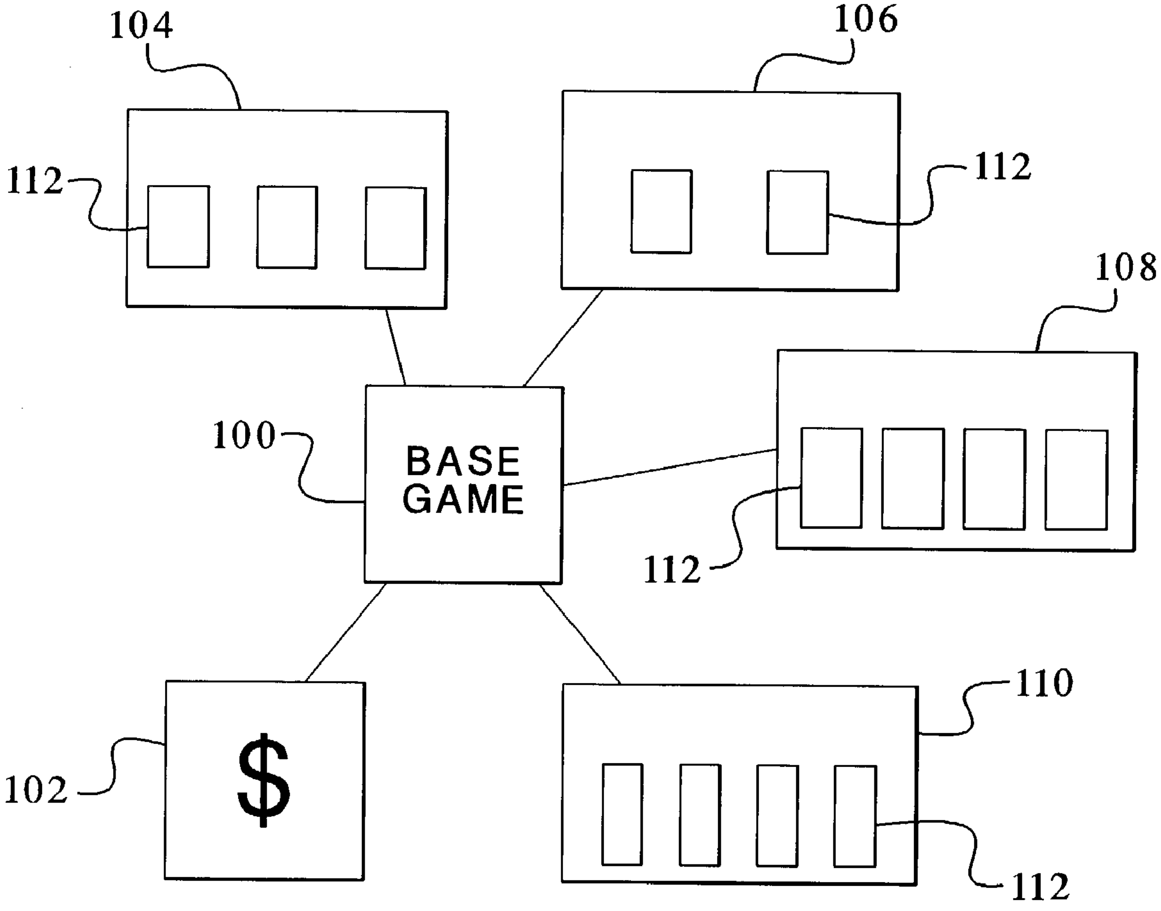
FIG. 3 is a schematic diagram of the general configuration of the present invention including a base game, base game awards and symbol sets.

Referring now to FIG. 3, a general embodiment of the present invention includes a base game 100, a base game award 102, a plurality of symbol sets 104 through 110, each having a plurality of symbols 112. The general embodiment of the present invention also includes the individual symbols and values for the symbols, which are illustrated and discussed below.

The base game 100 includes any well known game of slot, poker, blackjack or keno or any other suitable game. Each game includes a device or mechanism that randomly generates outcomes. For example, slot machines include reels 34 (FIGS. 1A and 1B) having symbols. Poker and blackjack include dealing cards from a standard deck of cards. Keno includes randomly generating a plurality of numbers from a set of numbers. Depending on the randomly generated outcome of the generation devices, each embodiment of the base game 100 provides base game awards 102, which are generally redeemable for money.

The progressive game of the present invention includes the symbol sets 104 though 110, which are linked to the base game 100 through a computer program preferably stored in the memory device 40 (FIG. 2). Each of the sets 104 through 110 includes one or more and preferably a plurality of symbols 112. That is, the gaming device 10 awards a progressive award when the base game 100 generates all of the progressive award symbols 112 of a particular set.

In many embodiments of the present invention, the base game outcome or symbol 112 directly provides a component of a set. That is, the symbol 112 is the actual component or constituent of the sets 104 through 110. For example, in a blackjack or poker embodiment, the present invention includes a set requiring the base game 100 to generate the Jack, Queen, King and Ace of a suit, after which the game awards the progressive award. The generated symbols 112 are the actual card, the denominations and the suits. A hand of these cards forms the set 104. Likewise, in a slot or keno embodiment example, the symbols 112 are the base game symbols or numbers, respectively, some of which are the actual components of the respective sets. The sets of the slot and keno embodiments consist of the generated symbols and numbers, respectively.

In other embodiments of the present invention, the base game outcome or symbol 112 indirectly produces a component of a set. That is, the symbol 112 is a condition upon which the actual component of the set is generated. For example, in a blackjack or poker embodiment, the present invention includes a set requiring four jokers, which are the components, wherein the gaming device 10 provides a joker upon the base game 100 condition or generation of a blackjack (card values adding to 21) or a straight (five sequential cards in a row), respectively. Here, the set components are the jokers and the symbol is the required condition, i.e., obtaining a blackjack or a straight. For the purposes of this invention, "symbols" includes progressive award components and progressive award conditions, wherein these terms have the meaning described above.

FIG. 3 illustrates four symbol sets 104 through 110, however, the present invention may include any number of sets including one. The present invention in one embodiment provides sets having the same number of symbols 112 or sets having a different number of symbols. The symbol sets 104 through 110 include three symbols, two symbols, four symbols and four symbols, respectively; however, the sets may have any number of symbols 112. Because the present invention preferably includes a progressive game, the sets preferably each include a plurality of symbols 112.

Method of Operation

Figure 4:
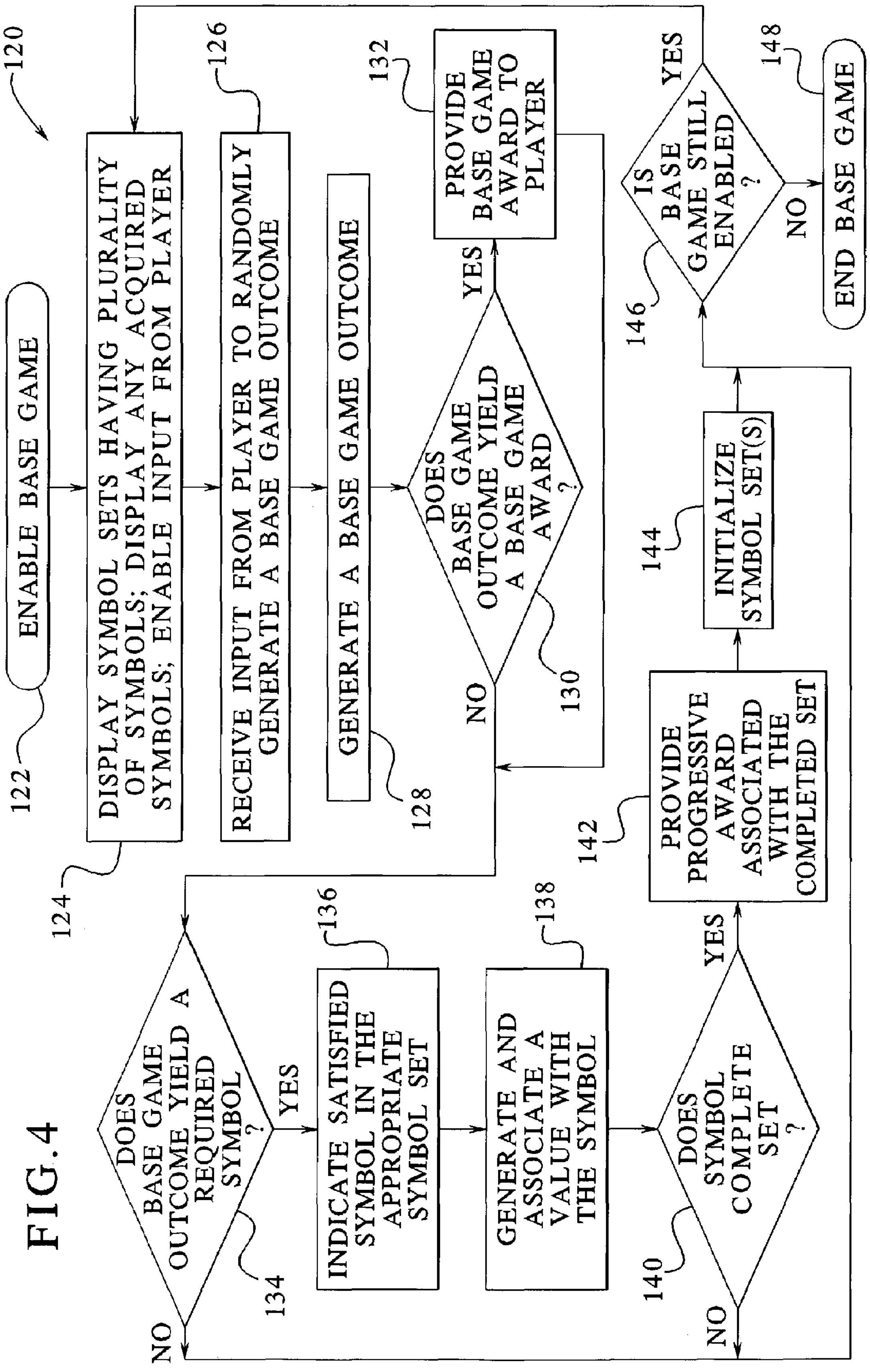
FIG. 4 is a schematic flow diagram illustrating one method of the present invention.

Referring now to FIG. 4, one method 120 of the present invention begins when the base game is enabled, as indicated by the oval 122. As illustrated with respect to FIGS. 1A and 1B, to enable the base game, the player inserts the appropriate amount of money or tokens at coin slot 12 or bill acceptor 14. As long as the player maintains one or more credits, indicated by the credit display 16, the gaming device 10 enables base game play.

As indicated by block 124, the game displays one or more symbol sets preferably having a plurality of symbols. The game preferably displays the sets on one of the display devices 30 or 32. Since the present invention includes a progressive game, one or more of the symbols may have already been satisfied or generated in a prior turn of play of the base game. That is, the processor 38 (FIG. 2) is not adapted to reset or initialize the symbol sets upon the conclusion of play of the base game, i.e., a cash out. As indicated by block 124, the game displays if any of the symbols of any of the sets has been generated in prior games. The game simultaneously enables a player input, e.g., pulling arm 18 or pushing play button 20 (FIGS. 1A and 1B).

Upon receipt of an input from the player to randomly generate a base game outcome, as indicated by block 126, the game generates the base game outcome, as indicated by block 128. In a slot embodiment, the base game outcome includes the generation of a plurality of symbols on a plurality of reels, wherein the processor analyzes the symbols along one or more paylines 56 (FIGS. 1A and 1B). In a poker or blackjack embodiment, the base game outcome includes the generation of a plurality of known playing cards. In keno, the base game generates a plurality of numbers.

The game determines whether the base game outcome yields a base game award, as indicated by diamond 130. If the base game outcome yields a base game award, the game provides the player with the base game award, as indicated by block 132. The base game awards of the present invention include any known award, such as game credits, a game credit multiplier or other item of value, e.g., a number of picks from a prize pool or a progressive award pool.

In the method 120, whether or not the base game outcome yields a base game award, the game determines whether the base game outcome yields one or more symbols of one or more sets, as indicated by diamond 134. One method for determining whether the base game outcome yields a symbol of a set is discussed in detail below. In an alternative embodiment, the game determines whether the base game outcome yields one or more symbols only upon the generation of a base game award. In a further alternative consolation method embodiment, the game determines whether the base game outcome yields one or more symbols of one or more sets only upon the non-generation of a base game award.

If the base game outcome yields a symbol of a set, the game indicates the satisfied symbol in the appropriate symbol set, as indicated by block 136. Where the symbol is a component of the symbol sets, the game displays the symbol (e.g., slot symbol, playing card or keno number) in the appropriate set. Where the symbol is a condition of the symbol sets, the game displays the outcome of the condition (e.g., display joker playing card upon generation of blackjack).

The game preferably generates and associates a value with the symbol, as indicated by block 138. As discussed in detail below, the game predetermines or randomly determines which value of a value pool or database belongs to or is associated with a particular progressive award symbol. The game includes displaying or alternatively not displaying the value in conjunction with the satisfied symbol indication of block 136. The progressive awards of the symbol sets preferably include a combination of the values associated with the symbols of the completed set.

The game determines whether the generated symbol completes a symbol set, as indicated by diamond 140. Referring briefly to FIG. 3, the symbol set 104 requires three symbols 112. The symbol set 106 requires two symbols 112. Both the symbol sets 108 and 110 require four symbols 112 and thus at least two sets preferably have a different number and variety of symbols 112. The present invention, however, contemplates two sets having one or more of the same symbols 112.

If the generated symbol completes a symbol set, the game awards a progressive award associated with the completed set, as indicated by block 142. One method for determining the progressive award of a completed symbol set is discussed in a slot machine embodiment below. As stated above, the method for determining or calculating the progressive award preferably includes combining (e.g., adding or multiplying) the values associated with the symbols of the completed set. In one embodiment, the game provides the progressive award, which is a combination of the values, plus an additional award for fulfilling the symbols of a set. The additional award is provided with the progressive award upon completion of the set.

As disclosed above, the processor 38 (FIG. 2) preferably does not reset or initialize the symbol sets upon the conclusion of play of the base game. The processor 38, however, does reset or initialize one or more of the symbol sets upon the completion of a symbol set and an associated progressive award issuance, as indicated by block 144. In one embodiment, the processor resets or initializes each of the symbol sets, i.e., removes any satisfied symbols from all the sets. In another preferred alternative embodiment, the processor resets or initializes only the satisfied symbol set.

If the base game outcome does not yield a symbol (diamond 134), if the generated symbol does not complete a symbol set (diamond 140) or if the processor resets or initializes the symbol sets, the game determines whether the base game is still enabled, as indicated by diamond 146. The base game is no longer enabled if: (i) the player's credits have been exhausted, as indicated in the credit display 16 (FIGS. 1A and 1B); or (ii) the player cashes out such as by pushing a cash out button 26 or a functional poker, blackjack or keno device equivalent.

When the base game is no longer enabled, i.e., upon a cashout, the game ends, as indicated by oval 148. It should be appreciated that the processor does not reset or initialize the symbol sets upon ending the base game. That is, unless the processor has just reset or initialized the symbol sets after a progressive award issuance, any symbols and symbol awards generated while the base game is enabled remain generated and indicated for the next game and possibly a different player.

If the base game is still enabled (credits remain) when the base game outcome does not yield a symbol (diamond 134), the generated symbol does not complete a symbol set (diamond 140) or the processor resets or initializes the symbol set, the game enables another player input, as indicated by block 124. It should be appreciated that the player can continue to play for base game awards, as indicated by diamond 130, and play for the progressive award, as indicated by diamond 140, as long as the player maintains at least one credit in the gaming device 10.

Example Slot Embodiment

Figure 5:
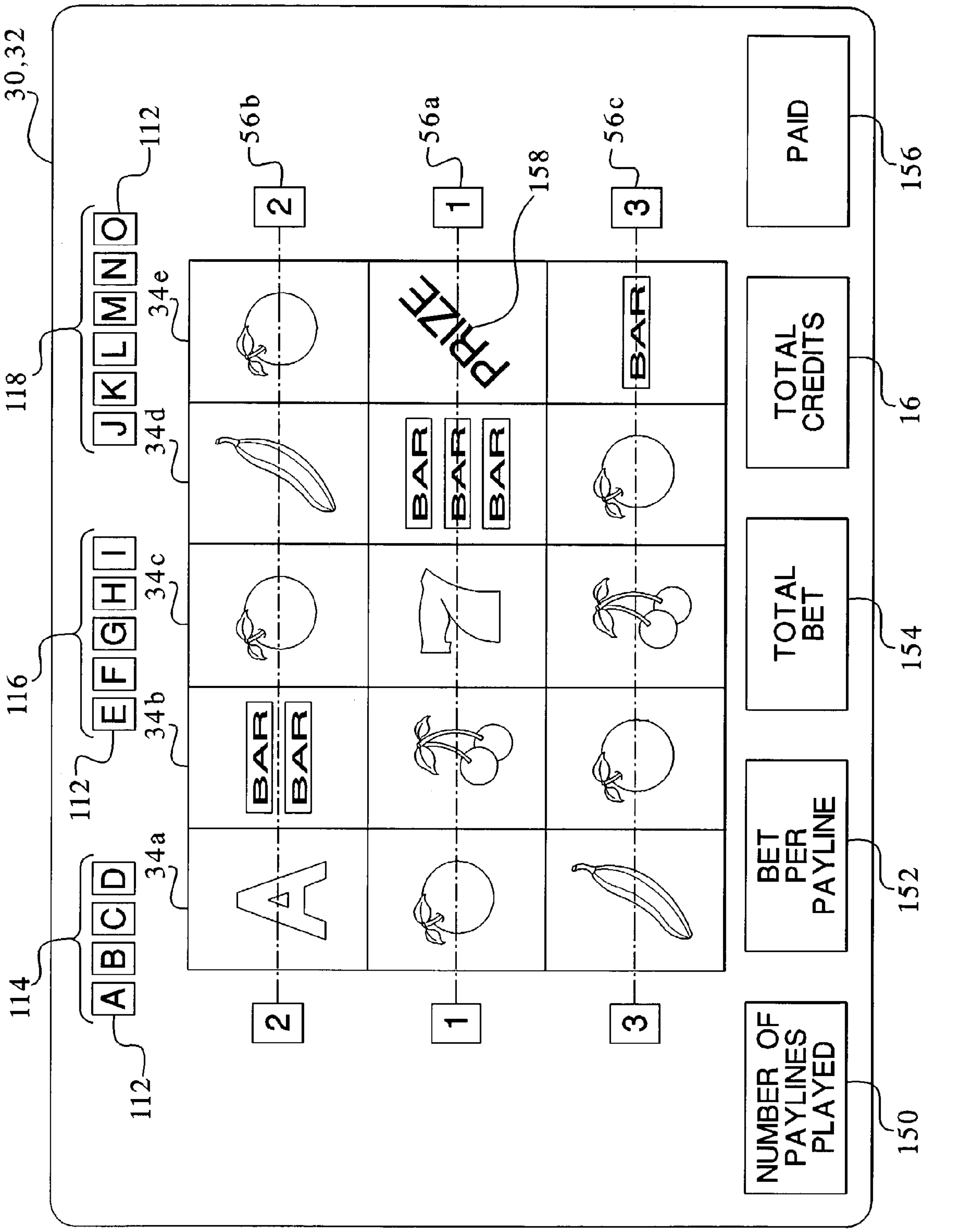
FIG. 5 is an enlarged front elevational view of a display device shown in FIGS. 1A and 1B, illustrating a slot machine embodiment of the present invention.

Referring now to FIG. 5, an example slot machine embodiment of the present invention is displayed on one of the display devices 30 or 32 of FIGS. 1A and 1B. The display device includes five reels 34*a* through 34*e*. Typical slot machines include three or five reels. The present invention includes any desired number of reels. The display device includes three paylines 56*a* through 56*c*. Typical slot machines include one, three, five, nine, ten and fifteen paylines. Although any number of paylines can be used. For the ease of illustration, the embodiment of FIG. 3 includes three paylines.

The display device includes three symbol sets 114, 116 and 118, each requiring a plurality of symbols 112. In this embodiment, the sets include exclusive symbols. That is, none of the symbols 112 of any set appear in another set. The present invention requires that the game generate the symbols "A" through "D" for the player to win the progressive award of the set 114. The present invention requires that the game generate the symbols "E" through "I" for the player to win the progressive award of the set 116. The present invention requires that the game generate the symbols "J" through "O" for the player to win the progressive award of the set 118.

The display device includes a plurality of indicators pertaining to the player's wager. The payline indicator 150 displays the number of paylines 56 that the player has activated. Although not illustrated, the multi-payline slot machine embodiment includes a simulated video or electromechanical selector that enables the player to elect to play, e.g., one, two or three paylines. The bet per line indicator 152 displays the amount the player has wagered per activated payline 56. Although not illustrated, the slot machine embodiment includes a simulated video or electromechanical selector that enables the player to elect to play, e.g., one to five credits per payline. The game preferably multiplies a base game win by the number of credits wagered along an associated winning payline.

The total bet indicator 154 displays the product of the number of activated paylines and the bet per payline. The total bet is the amount of credits that the player risks or wagers on every pull of the pulling arm 18 or push of the play button 20 (FIGS. 1A and 1B). As stated above, gaming device 10 displays accrued credits in the credit display 16. The credit display 16 updates the player's total credits after a win or loss. The payout indicator 156 displays the amount that the base game and or the progressive game of the slot machine embodiment pays out after a pull of the pulling arm 18 or push of the play button 20.

In the slot machine embodiment of the present invention, the reels 34*a* through 34*e* come to a stop after a pull of the pulling arm 18 or push of the play button 20 and display a combination of symbols as illustrated in FIG. 5. The object of the progressive game is to generate the letters which are the symbols of the symbol sets 114 through 118.

It should be appreciated that one skilled in the art may develop many exciting and enjoyable schemes for generating one or more of the symbols. The slot machine embodiment includes awarding any letter that appears on an activated payline. For instance, if the player has wagered the payline 56*b*, the present invention includes awarding the required letter "A" when it appears, as illustrated on the reel 34*a* and the payline 56*b*. In one embodiment, the slot machine provides any letter that appears in combination with a base game win on an activated payline. For instance, if the player has wagered the payline 56*b* and the combination of the double bar of reel 34*b* and the banana of reel 34*d* form a base game win, the present invention includes awarding the required letter "A" appearing on the reel 34*a* and the payline 56*b*.

In another preferred embodiment, the slot machine embodiment includes a dual random generation, wherein the game randomly generates a changeable symbol 158, e.g., the PRIZE symbol, which alone or in combination with one or more other symbols along an activated payline, randomly generates, e.g., one of the letters from a pool of letters. In one embodiment, the appearance of the changeable symbol 158 along an activated payline or alternatively along any payline causes the changeable symbol 158 to change into one of the required symbols of the sets. In another embodiment, the appearance of the progressive award symbol 158 in combination with one or more other symbols, e.g., the lucky 7 symbol, along an activated payline or alternatively along any payline causes the changeable symbol 158 to change into one of the required symbols 112 of the sets 114, 116 or 118.

It should be appreciated by those skilled in the art that current video display technology enables a plurality of exciting and entertaining ways to change the changeable symbol 158 into one of the required symbols 112. The present invention includes a display device 30 or 32 simply discontinuing the changeable symbol 158 display and replacing it with the display of a symbol 112. Preferably, however, the display shows a transition to one of the randomly generated symbols 112. For example, the present invention includes the changeable symbol 158 being an independent reel that flashes different symbols of the pool before stopping and displaying a randomly generated symbol 112. Alternatively, the present invention includes the display device performing an animated transformation or morph that changes or transforms the changeable symbol 158 into the randomly generated symbol 112.

In a similar manner, one poker or blackjack embodiment of the present includes the game randomly dealing an extra card in response to a symbol triggering event. The present invention alternatively includes a previously generated changeable card transforming or morphing into a randomly generated symbol 112. In one keno embodiment, the game includes randomly generating an extra number in response to a symbol triggering event. The present invention alternatively includes a previously generated changeable keno number transforming or morphing into a randomly generated symbol. In either the card or keno embodiment, an extra or additional icon or character can display the symbol.

Referring now to FIG. 6A, a symbol pool 160 includes the symbols 112 of the symbol sets 114 though 118. When a changeable symbol 158 transforms or morphs into a symbol, the processor 38 (FIG. 2) preferably randomly generates one of the symbols 112 of the symbol pool 160. The present invention includes enabling or not enabling the processor 38 to generate the same symbol 112 more than once, however, the processor 38 is preferably enabled to generate the same symbol 112 more than once. That is, when the game generates the letter "A" of the set 114 a first time, the game may or may not be able to do so a second time. If allowed to do so, the game in one implementation increases the value associated with the "A" symbol.

The present invention alternatively does not randomly draw from a symbol pool, such as the pool 160. In such a case, the base game either directly generates the symbols 112, or the base game generates a changeable symbol 158 that is predefined to yield a particular symbol 112 of a set 114, 116 and 118.

The present invention preferably randomly generates the symbols. In FIG. 6B, a symbol pool 162 includes the symbols 112 of the symbol sets 114, 116 and 118, wherein each symbol 112 is associated with a likelihood of generation percentage 164, and wherein the game is enabled to randomly select at least one symbol more often than at least one other symbol. In the pool 162, the "E," "H," "J," "L" and "O" symbols are each twice as likely to be generated as each of the remaining symbols. The weighted symbol pool 162 along with the symbol sets 114, 116 and 118, requiring different numbers of symbols, enable the game designer to create a dynamic and interesting progressive game for the player.

As illustrated in FIG. 6C, a symbol pool 166 includes the symbols 112 of the symbol sets 114, 116 and 118 as well as the dummy selections 168. The dummy selections 168 do not satisfy any of the symbols 112 of the symbol sets 114 though 118, and thus their generation does not further the player toward the progressive award. The present invention includes weighting a symbol pool having dummy selections 168. The dummy selections 168 further enable the game designer to create a dynamic and interesting progressive game for the player.

Determining the Progressive Award

Upon fulfilling or completing a symbol set, the present invention awards a progressive award associated with the completed set, as indicated by block 142 of FIG. 4. The present invention includes maintaining a single, predetermined progressive award for all of the symbol sets, wherein the first completed set triggers the progressive award. The present invention also includes maintaining multiple predetermined progressive awards, one pre-associated with each of the symbol sets, wherein the first completed set triggers its pre-associated progressive award. The present invention further includes maintaining multiple progressive awards in a weighted or non-weighted progressive award database (not illustrated), wherein the game randomly generates a progressive award upon the first completed symbol set.

In another effort to create a dynamic and interesting progressive game for the player, the present invention includes the following method for determining the progressive award, which rewards the player for wagering a greater amount of money. Referring now to FIG. 7, a value database 170 includes a plurality of values 172 as well as the likelihood of generation percentages 164 disclosed in connection with FIG. 6B. The present invention can provide any number of values 172 having any desired range.

Upon generating a symbol 112 via one of the methods disclosed above, the processor 38 (FIG. 2) preferably randomly generates a value 172. The present invention includes enabling or not enabling the processor 38 to generate the same value 172 more than once. The values 172, like the base game awards, represent any known type of award, such as a game credit, a game credit multiplier or other item of value, e.g., a number of picks from a progressive award pool.

The game in one embodiment multiplies a generated value by the number of credits wagered along a winning payline, wherein the bet per line indicator 152 (FIG. 5) indicates the number of credits. The game alternatively adds a generated value to the number of credits wagered along the winning payline. The game further alternatively multiplies or adds a generated value to the total number of credits wagered, which are displayed in the total bet indicator 154.

Figure 8A:
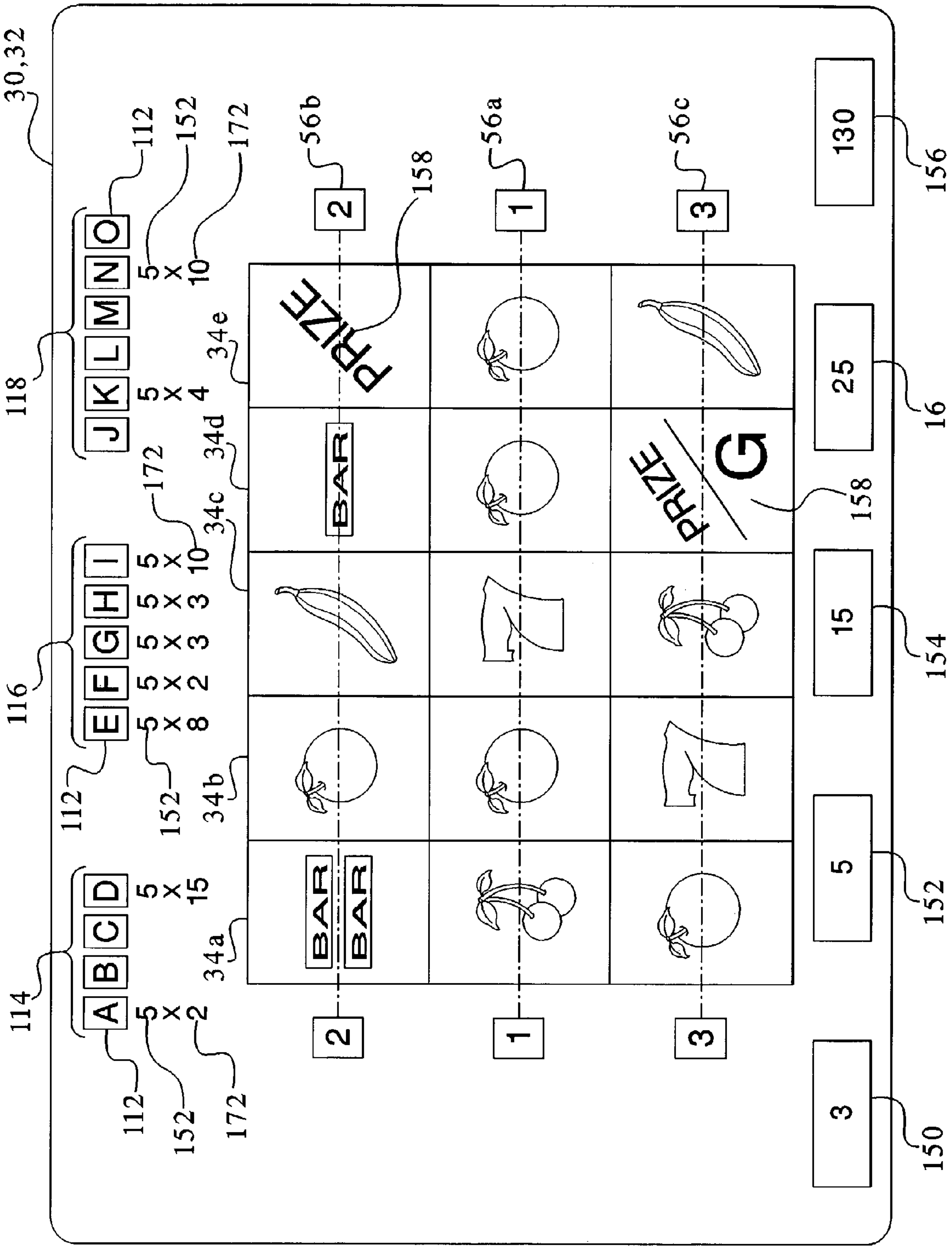
FIG. 8A is an enlarged front elevational view of a display device shown in FIGS. 1A and 1B, illustrating the present invention at the moment a player completes a symbol set.

Referring now to FIG. 8A, a display device 30 or 32 illustrates an example of the present invention at the moment a player completes a symbol set. The player has wagered or activated all three paylines, as displayed by payline indicator 150. The player has wagered five credits per payline, as indicated by the bet per line indicator 152. The player thus risks or wagers fifteen credits every time the player pulls the pulling arm 18 or pushes the play button 20, as indicated by the total bet indicator 154.

Either the current player in the current game, the current player in a plurality of games or a plurality of players in a plurality of games has generated some of the required symbols 112, which have aided in the current game's completion of the symbol set 116. That is, the current player reaps the benefit of past play. Below the symbols of the sets, FIG. 8A illustrates a plurality of multiplications of the bet per payline 152 (assume the bet per payline to be the same during all games leading to the current progressive win) by the values 172 that have been generated in association with the generation of the symbols 112. The present invention may be adapted to display the multiplication components, and/or to display the product of the components or not display either.

When a player who bet five credits per payline randomly generated the "A" symbol, i.e., from one of the symbol pools 160, 162 or 166, the game randomly generated the value 172 of two from the symbol award database 170. Likewise, although not necessarily in any particular order, the game generated the value 172 of fifteen upon the random generation of the "D" symbol, the value 172 of eight upon the random generation of the "E" symbol, the value 172 of two upon the random generation of the "F" symbol, the value 172 of three upon the random generation of the "G" and "H" symbols, the value 172 of ten upon the random generation of the "I" symbol, the value 172 of four upon the random generation of the "K" symbol and the value 172 of ten upon the random generation of the "N" symbol. It should be appreciated that betting five credits per payline is one wager the player can make. Most slot games enable the player to wager a different number of credits per payline in different games. For ease of illustration, it is assumed that each wager has been for five credits.

The game of FIG. 8A requires a lucky "7" symbol in combination with a changeable symbol 158 along an active payline for the game to generate a symbol. Thus, the player did not obtain a required symbol 112 after spinning the reels 34 and receiving only the changeable symbol 158 on the active payline 56*b*. The player however received the lucky "7" symbol in combination with the changeable symbol 158 along the active payline 56*c*, whereby the changeable symbol 158 transformed or morphed into the symbol "G" (shown here with the slash). Generating the symbol "G" completed the symbol set 116, whereby the player received the addition of the values 172 multiplied by the wager per payline 152 associated with each symbol 112 of the set 116, cumulatively shown as 130 credits in the payout indicator 156.

The present invention may be adapted to add or multiply the products associated with each symbol of a completed set to form the progressive award. It should be appreciated that in the example of FIG. 8A, the player could have won one or more base game awards in addition to the progressive award, which the payout indicator 156 would additionally display. In one embodiment, the game provides an additional award besides the progressive award for fulfilling the symbols of a set. The additional award is provided with the progressive award upon completion of the set.

The changeable symbols 158 may be designated to apply to only one set 114, 116 or 118. That is, there may be a particular changeable symbol 158 dedicated to only generate set 114 symbols or set 118 symbols, etc. These dedicated changeable symbols 158 in one implementation have indicia relating to their associated set. For example, a dedicated changeable symbol 158 for the set 116 could display "E to I."

The reels 34 may be adapted to have different percentages of dedicated changeable symbols 158 for different sets, making one or more sets harder to complete. Further, the dedicated symbols in one implementation are mixed with non-dedicated changeable symbols 158. In another implementation, the reels 34 only have dedicated symbols 158.

In a case where the changeable symbol 158 morphs or changes into a required symbol 112 that has already been generated, the game in one implementation updates a previous award product (value 172 times bet) with a new award product for the repeat generation. In another implementation, the game does not update the previous award product or provides a predefined consolation award to the player. In a further implementation, once the game generates a particular symbol 112, the game removes that symbol from the pools 160, 162 or 166, wherein remaining symbols 112 may still be generated.

Figure 8B:
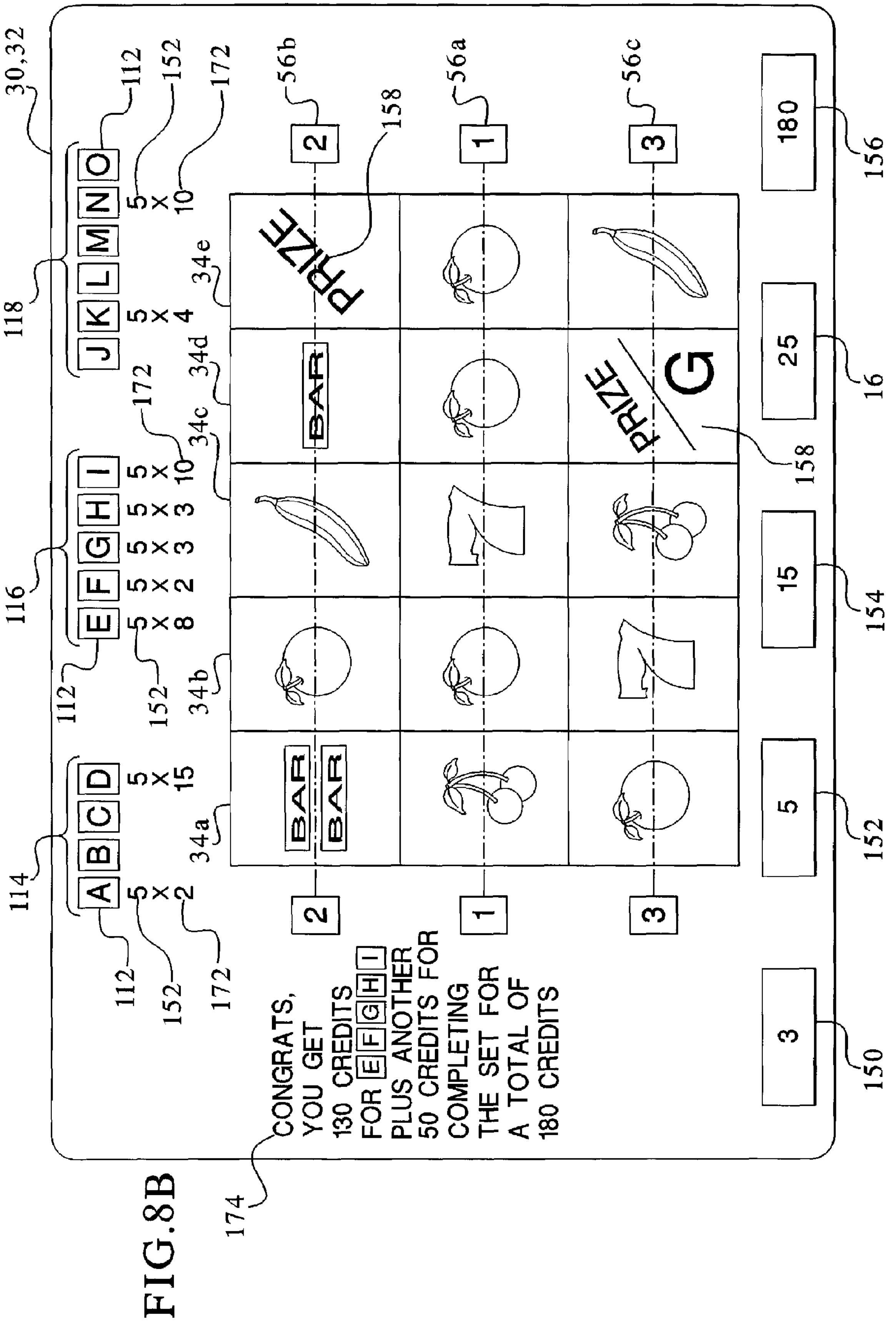
FIG. 8B is an enlarged front elevational view of a display device shown in FIGS. 1A and 1B, illustrating an additional symbol set fulfillment award feature of the present invention.

Referring now to FIG. 8B, in one alternative embodiment, the completion of a symbol set, such as one of the sets 114, 116 and 118, generates an additional award in addition to the progressive award as described above. By way of example, when the player receives the lucky "7" symbol in combination with the changeable symbol 158 along the active payline 56*c*, the changeable symbol 158 transforms or morphs into the required symbol "G". Generating the "G" symbol 112 completes the symbol set 116. A suitable audio, visual or audio-visual message 174 informs the player that the game provides the progressive award of 130 credits plus an additional award of fifty for having completed the set 116.

The additional award does not depend on the player's bet or upon a generated value 172; rather it is an extra award for completing a set. The additional award is also progressive since its likelihood of being issued can and likely does vary from player to player. The closer a set is to completion, the more likely the player obtains the additional award. A separate additional award is associated with each set 114, 116 and 118 in one implementation, and the game may or may not display each set's associated additional progressive award. In another implementation, the game does not to provide the additional award for one or more sets. In a further implementation, the game randomly decides whether to provide an additional award upon the completion of a set.

In one implementation, the additional awards are different for different sets, e.g., the more symbols 112 a set has, the higher its associated additional award is upon completion of the set. In another implementation, the game provides the same additional award regardless of which set the player completes. In a further implementation, the game randomly determines the value of the additional award from a weighted database (not illustrated), such as the database 170, or a non-weighted database.

Figure 8C:
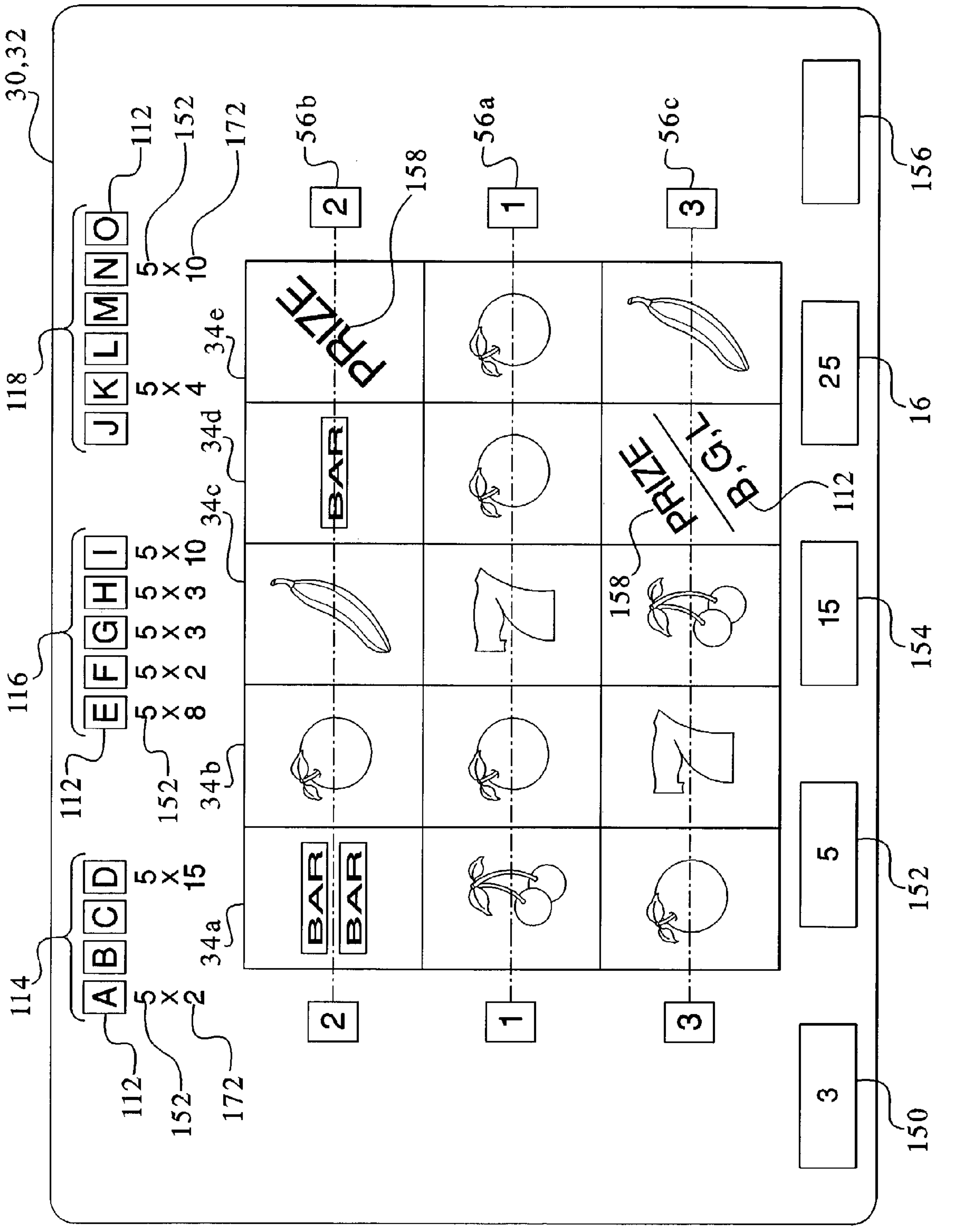
FIG. 8C is an enlarged front elevational view of a display device shown in FIGS. 1A and 1B, illustrating the generation of a plurality of symbols at one time.

Referring now to FIG. 8C, in another alternative embodiment, when the player receives the lucky "7" symbol in combination with the changeable symbol 158 along the active payline 56*c*, the changeable symbol 158 transforms or morphs into a plurality of the required symbols 112; in this example, the symbols "B," "G" and "L." Thereafter, the symbols 112 update or complete their respective sets as the case may be, and the game determines award products (values 172 times bet) associated with each symbol 112. In this embodiment, therefore, the player may complete one or more or all of the sets, such as the sets 114, 116 and 118, with one spin of the reels.

In one implementation, the changeable symbol 158 changes or morphs into a first symbol 112, which changes or morphs into a second symbol 112, which changes or morphs into a third symbol 112, etc. In another implementation, the changeable symbol 158 changes or morphs and each associated symbol 112 is displayed, as illustrated in FIG. 8C.

In one implementation, the base game randomly generates a single symbol 112 for each incomplete set 114, 116 or 118. In another implementation, the base game randomly generates one or more symbols 112 for each incomplete set 114, 116 or 118. In a further implementation, the base game generates all necessary symbols 112 to complete a set. In yet another implementation, the base game generates all necessary symbols 112 to complete each set. In yet a further implementation, the game can randomly decide to employ any of the foregoing implementations. In still another implementation, the game first randomly generates how many symbols 112 to generate and then randomly generates that number of symbols from one of the pools 160, 162 or 166 or from the remaining unselected symbols 112 in the pools 160, 162 or 166.

Figure 8D:
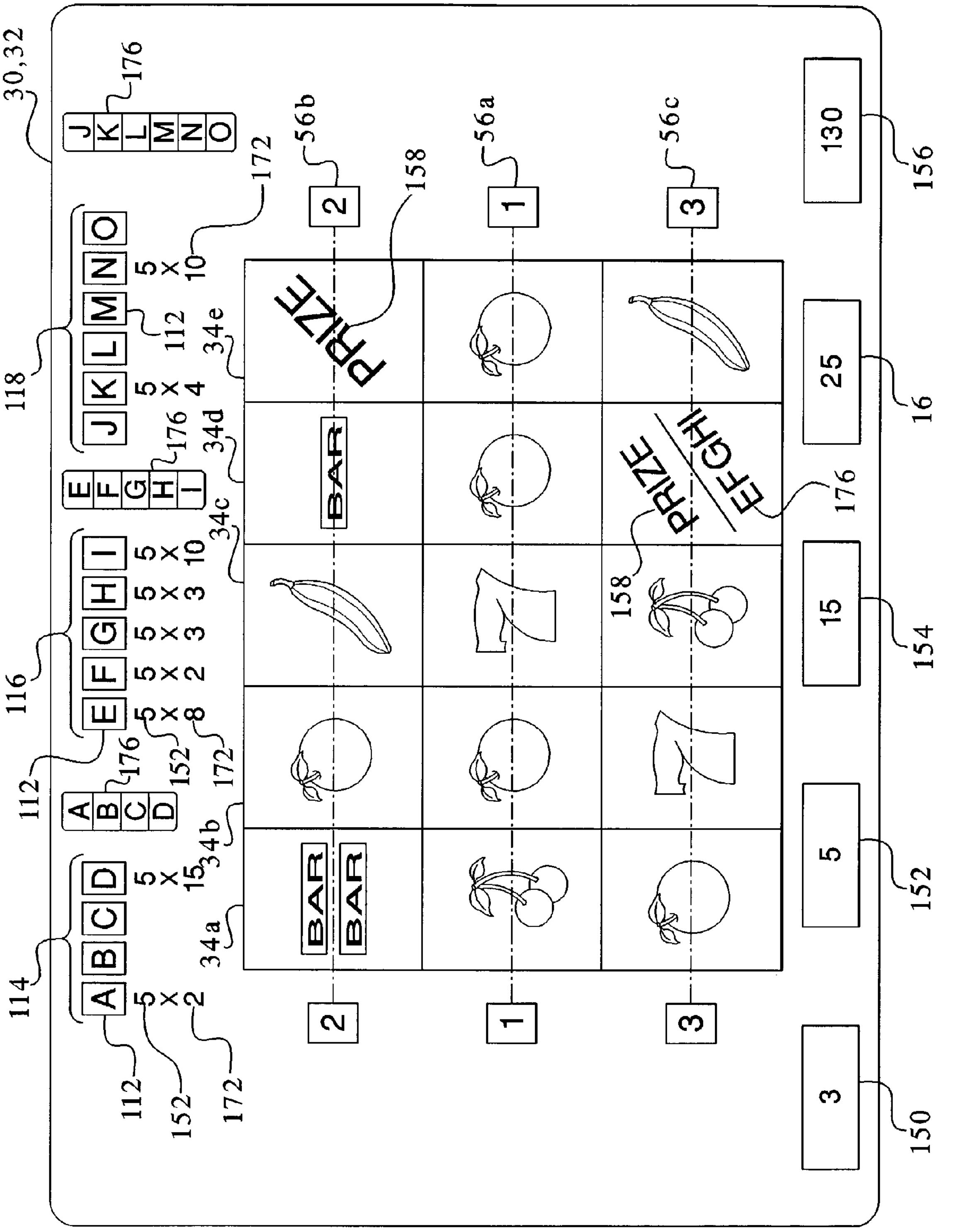
FIG. 8D is an enlarged front elevational view of a display device shown in FIGS. 1A and 1B, illustrating a master symbol feature of the present invention.

Referring now to FIG. 8D, in a further alternative embodiment, one or more of the sets 114, 116 or 118 is associated with a master symbol 176. Here, each set is illustrated as having an associated master symbol 176. The master symbol 176 includes each of the symbols 112 of its respective set. The master symbol 176 for the set 114 therefore includes the symbols "A," "B," "C" and "D." The master symbol 176 for the set 116 includes the symbols "E" through "I," and the master symbol 176 for the set 118 includes the symbols "J" through "O."

In one embodiment, when the player receives the lucky "7" symbol in combination with the changeable symbol 158 along the active payline 56*c*, the changeable symbol 158 may transform or morph into one of the master symbols 176. In FIG. 8D, the changeable symbol 158 transforms into the master symbol "EFGHI." The generation of a master symbol 176 may be implemented in a number of ways.

In one implementation, the master symbol 176 completes the appropriate set, whereby the game generates the progressive award as described above. In FIG. 8D, the master symbol "EFGHI" completes the set 116, the game generates a value 172 for any symbol 112 not already generated and multiplies it by the bet per payline 152 as illustrated. The game sums the award products to form the progressive award of 130, as illustrated in the payout indicator. In FIG. 8D, the master symbol "EFGHI" may have provided any or all of the illustrated values 172 depending upon how many individual symbols 112 had been previously generated. It should be appreciated that the result here is the same as that produced in FIG. 8A, i.e., a progressive award of 130 provided to the player, wherein the player generated each symbol 112 individually.

In another implementation, the game provides the additional award upon the generation of a master symbol 176. The game can employ any of the implementations described above in connection with FIG. 8B. That is, the game provides: (i) a different additional award depending upon the set that is filled; (ii) the same additional award regardless of which set the player completes; or (iii) randomly determines the value of the additional award from a weighted database (not illustrated), such as the database 170, or a non-weighted database.

In one embodiment, the game provides only the additional award upon the generation of a master symbol 176 but does not otherwise complete a set or provide a progressive award. In another implementation, the game provides the additional award and the progressive award when the game generates a master symbol 176. Here, the game combines the additional award with the progressive award to determine an overall award for generating a master symbol 176. It should be appreciated that the result here is similar to that produced in FIG. 8B, e.g., a total award of 180 provided to the player, wherein the player generated each symbol 112 individually.

Slot, Poker, Blackjack and Keno Embodiments

Referring now to FIG. 9, a table 180 includes a heading row 182, wherein each base game 182*a* of the present invention includes a base game random generation device 182*b*, an event that triggers a symbol generation 182*c*, a symbol generation device 182*d* and symbols 182*e*. The games 182*a* include slot, poker, blackjack and keno.

The base game random generation device 182*b* includes one or more symbol bearing reels for slot; a preferably simulated card dealing device for blackjack and poker and a preferably simulated number generating device for keno. Each of these devices are well known in the art.

The event that triggers a symbol generation 182*c* includes a predetermined symbol or combination for slot; jacks or better for poker; a bust for blackjack and a number being within a range for keno. For poker, an event that triggers a symbol further includes any two or more of a playing card denomination, a straight, a flush, a straight-flush, two pair and a full house. For blackjack, an event that triggers a symbol further includes a blackjack and any total hand number including twenty one.

The symbol generation device 182*d* includes generating another or changing or morphing a symbol for slot; dealing another or changing or morphing a card for poker and blackjack and generating another or changing or morphing a number for keno. The present invention includes a generation device 182*d*, wherein the triggering event 182*c* contains the symbol (e.g., when a payline combination triggers symbol generation and also contains the generated symbol). The symbol generating device 182*d* alternatively includes one or more additional random or predetermined generations (e.g., symbol combination, two of a kind or blackjack triggers generation from separate symbol pool).

The symbols 182*e* include symbols on a reel for slot, card denominations and suits for poker and blackjack and numbers for keno. The symbols 182*e* for poker and blackjack alternatively include jokers or non-playing card symbols.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A method of operating a gaming device including a plurality of instructions, said method comprising:

(a) causing at least one processor to execute the plurality of instructions to maintain a predetermined set of symbols;

(b) thereafter, causing the at least one processor to execute the plurality of instructions to randomly generate symbols of the set via one or a plurality of plays of a base game;

(c) causing at least one display device to display said randomly generated symbols;

(d) after randomly generating symbols of the set, causing the at least one processor to execute the plurality of instructions to additionally randomly generate at least one value associated with one of the generated symbols of the set;

(e) causing the at least one display device to display said at least one randomly generated value;

(f) causing the at least one display device to display a progressive award to a player when each of the symbols of the set is randomly generated, said progressive award including the randomly generated value; and (g) providing the progressive award to the player.

2. The method of claim 1, which includes causing the at least one processor to execute the plurality of instructions to output the symbols directly via the base games.

3. The method of claim 1, which includes causing the at least one processor to execute the plurality of instructions to output the symbols indirectly via the base games.

4. The method of claim 1, which includes causing the at least one processor to execute the plurality of instructions to maintain plurality of sets of symbols, each set including a plurality of symbols, wherein: (i) the base game generates symbols for each of the sets, (ii) at least one value is associated with the symbols of each of the sets generated by the base game, and (iii) a progressive award is displayed and provided to the player for any one of the sets when all of the symbols of said set are generated, the progressive award including the value associated with said set.

5. The method of claim 4, which includes enabling the player to win the progressive award for each of the sets before resetting the symbols generated for said sets.

6. The method of claim 4, which includes causing the at least one processor to execute the plurality of instructions to reset the symbols generated for any set that has each of the symbols of said set generated and maintaining any symbols generated for the other sets.

7. The method of claim 4, wherein one play of the base game includes causing the at east one processor to execute the plurality of instructions to generate a plurality of the symbols of one of the sets.

8. The method of claim 4, wherein one play of the base game includes causing the at least one processor to execute the plurality of instructions to generate at least one of the symbols for a plurality of the sets.

9. The method of claim 1, wherein the base game is a game selected from the group consisting of: a slot game, a poker game, a blackjack game and a keno game.

10. The method of claim 1, wherein causing the at least one processor to execute the plurality of instructions to generate the symbols of the set includes generating at least one symbol along a payline of a slot game.

11. The method of claim 1, wherein causing the at least one processor to execute the plurality of instructions to generate symbols of the set includes generating a poker combination selected from the group consisting of: at least two of the same card denomination, a straight, a flush, a straight-flush, a two pair combination and a full house.

12. The method of claim 1, wherein causing the at least one processor to execute the plurality of instructions to generate the symbols of the set includes generating a blackjack combination selected from the group consisting of: a blackjack, a total hand number and a bust.

13. The method of claim 1, wherein one play of the base game includes causing the at least one processor to execute the plurality of instructions to generate a plurality of the symbols of the set.

14. The method of claim 1, wherein one play of the base game includes causing the at east one processor to execute the plurality of instructions to generate a master symbol that satisfies a symbol requirement for the set, causing the at least one display device to display the master symbol and providing the progressive award to the player.

15. The method of claim 1, which includes enabling a single player to have multiple plays of the base game to generate each of the symbols of the set.

16. The method of claim 1, which includes enabling multiple players to have multiple plays of the base game to generate each of the symbols of the set, wherein the player who generates a final symbol in the set is provided the progressive award.

17. The method of claim 1, which includes causing the at least one processor to execute the plurality of instructions to generate an item via the base game and causing the at least one display device to display said generated item, said item changes visually into one of the symbols of the set, wherein the item is chosen from a group consisting of: a reel symbol, a card and a keno number.

18. The method of claim 1, which includes causing the at least one processor to execute the plurality of instructions to form the progressive award by combining a plurality of the randomly generated values associated with the generation of the symbols of the set.

19. The method of claim 1, which includes causing the at east one processor to execute the plurality of instructions to form the progressive award by combining the randomly generated value with at least one component of a base game wager.

20. The method of claim 1, which includes causing the at least one processor to execute the plurality of instructions to form the progressive award by combining each of a plurality of randomly generated values associated with the generation of the symbols of the set with a plurality of components of a plurality of base game wagers.

21. The method of claim 1, which includes causing the at least one processor to execute the plurality of instructions to form the progressive award by assigning an award to the set of symbols.

22. The method of claim 1, which includes providing an award additional to the progressive award upon generating the symbols of the set.

23. The method of claim 1, which is provided via a data network.

24. The method of claim 23, wherein the data network includes an internet.

25. A method of operating a gaming device including a plurality of instructions, the method comprising:

(a) causing at least one processor to execute the plurality of instructions to maintain a plurality of predetermined sets of symbols;

(b) thereafter, causing the at least one processor to execute the plurality of instructions to randomly generate symbols of the sets via one or a plurality of plays of a base game;

(c) causing at least one display device to display said randomly generated symbols;

(d) after randomly generating symbols of the set, causing the at east one processor to execute the plurality of instructions to additionally randomly generate a value associated with at least one of the generated symbols of each of the sets;

(e) causing the at least one display device to display said randomly generated value;

(f) causing the at least one display device to display a progressive award to a player for each set when, for any given set, all of the symbols of the set are generated, and wherein the progressive award for the set includes at least one of the randomly generated values associated with at least one of the symbols of the set randomly generated in the base game; and (g) providing the progressive award to the player.

26. The method of claim 25, wherein the base game includes causing the at least one processor to execute the plurality of instructions to perform an event associated with one of the sets that triggers a generation of one of the symbols of the set.

27. The method of claim 26, wherein causing the at least one processor to execute the plurality of instructions to perform, the event includes generating and displaying at least one symbol on at least one reel of a slot game.

28. The method of claim 26, which includes causing the at least one processor to execute the plurality of instructions to provide a different symbol generating event in the base game for each of the sets of symbols.

29. The method of claim 25, which is provided via a data network.

30. The method of claim 29, wherein the data network includes an internet.

31. A method of operating a gaming device including a plurality of instructions, the method comprising:

(a) causing at least one processor to execute the plurality of instructions to maintain a predetermined set of symbols;

(b) thereafter, causing the at least one processor to execute the plurality of instructions to randomly generate symbols of the set via one or a plurality of plays of a base game;

(c) causing at least one display device to display said randomly generated symbols;

(d) after randomly generating symbols of the set, causing the at east one processor to execute the plurality of instructions to generate values, each value greater than zero and associated with each one of the generated symbols of the set;

(e) causing the at least one display device to display said randomly generated values;

(f) causing the at least one display device to display a progressive award to a player upon the generation of all of the symbols of the set, the progressive award including all of the randomly generated values associated with the randomly generated symbols of said set, wherein at least two of the randomly generated values associated with the randomly generated symbols of said set are different; and (g) providing the progressive award to the player.

32. The method of claim 31, which includes causing the at least one processor to execute the plurality of instructions to maintain a plurality of sets of symbols, each set having an associated progressive award that includes all of the values associated with each of the symbols of the set generated in the base game.

33. The method of claim 32, which includes providing the progressive award associated with the set that is first to have each of its symbols generated.

34. The method of claim 31, wherein the base game is a game selected from the group consisting of: a slot game, a poker game, a blackjack game and a keno game.

35. The method of claim 31, which includes causing the at least one processor to execute the plurality of instructions to trigger in the base game an event that generates one of the symbols of the set.

36. The method of claim 35, which includes causing the at least one processor to execute the plurality of instructions to trigger one of: a reel symbol and a reel symbol combination occurring along a payline of a slot game.

37. The method of claim 35, which includes causing the at least one processor to execute the plurality of instructions to trigger a poker combination selected from the group consisting of: at least two of the same card denomination, a straight, a flush, a straight-flush, a two pair combination and a full house.

38. The method of claim 35, which includes causing the at least one processor to execute the plurality of instructions to trigger a blackjack combination selected from the group consisting of: a blackjack, a total hand number and a bust.

39. The method of claim 31, which includes causing the at east one processor to execute the plurality of instructions to trigger the base game an event that generates a plurality of the symbols.

40. The method of claim 31, which includes causing the at east one processor to execute the plurality of instructions to trigger in the base game an event that generates each of the symbols of the set.

41. The method of claim 31, which includes causing the at least one processor to execute the plurality of instructions to trigger in the base game an event that generates a master symbol and causes the at least one display device to display the master symbol, the master symbol completing the generation of the symbols of the set and causing the progressive award to be provided to the player.

42. The method of claim 31, which includes causing the at least one processor to execute the plurality of instructions to trigger the base game an event that generates a master symbol, and causes the at least one display device to display the master symbol, the master symbol completing the generation of the symbols of the set and causing a predefined award to be provided to the player.

43. The method of 31, wherein causing the at least one processor to execute the plurality of instructions to generate symbols of the set includes generating symbols on a set of reels of a slot game.

44. The method of claim 31, wherein causing the at least one processor to execute the plurality of instructions to generate symbols of the set includes generating face cards in a poker game.

45. The method of claim 31, wherein causing the at least one processor to execute the plurality of instructions to generate symbols of the set includes generating face cards in a blackjack game.

46. The method of claim 31, wherein causing the at least one processor to execute the plurality of instructions to generate symbols of the set includes generating a changeable item that changes into one of the symbols of the set, the changeable item chosen from the group consisting of: a reel symbol, a face card and a number.

47. The method of claim 31, which includes causing the at least one processor to execute the plurality of instructions to combine each of the generated values to determine the progressive award.

48. The method of claim 31, which includes causing the at east one processor to execute the plurality of instructions to multiply each generated value by a base game bet to determine a plurality of amounts and combining the determined amounts to determine the progressive award.

49. The method of claim 31, which includes providing an additional award for generating the symbols of the set, wherein the additional award is provided with the progressive award.

50. The method of claim 31, which is provided via a data network.

51. The method of claim 50, wherein the data network includes an internet.

52. A method of operating a gaming device including a plurality of instructions, said method comprising:

(a) causing at east one processor to execute the plurality of instructions to maintain, a plurality of predetermined sets of symbols;

(b) thereafter, causing the at least one processor to execute the plurality of instructions to randomly generate symbols of the sets via one or a plurality of plays of a base game;

(c) causing at least one display device to display said randomly generated symbols;

(d) causing the at least one display device to display a progressive award to a player when each of the symbols of a first one of the sets of symbols is generated, said progressive award including at least one value associated with at least one of the symbols of said set, wherein said at least one value is randomly generated and caused to be displayed after said at least one associated symbol is randomly generated and displayed;

(e) providing the progressive award to the player; and (f) causing the at least one processor to execute the plurality of instructions to reset the first set of symbols so that the first set of symbols has no generated symbols after providing the progressive award.

53. The method of claim 52, which includes causing the at least one processor to execute the plurality of instructions to reset the first set of symbols after providing the progressive award and maintaining any symbols generated for any of the other sets of symbols.

54. The method of claim 52, wherein the same progressive award is provided to the player regardless of which set of symbols has each of the symbols of the set generated and displayed.

55. The method of claim 52, which includes providing a different progressive award to the player depending upon which set of symbols has each of the symbols of the set generated and displayed, the progressive award based on an amount of symbols included in said set of symbols.

56. The method of claim 52, which includes providing at least one value associated with the generation of the symbols of the first set of symbols, wherein the progressive award includes the value.

57. The method of claim 52, which includes enabling the player to play the base game multiple times before generating each of the symbols of the first set of symbols.

58. The method of claim 52, which includes causing the at least one processor to execute the plurality of instructions to output via the base game the symbols of the sets.

59. The method of claim 52, which includes causing the at least one processor to execute the plurality of instructions to output indirectly via the base game the symbols of the sets.

60. The method of claim 52, which includes causing the at least one processor to execute the plurality of instructions to form the progressive award by assigning an award to the first of the sets of symbols with each of the symbols of the set generated and displayed.

61. The method of claim 52, which is provided via a data network.

62. The method of claim 61, wherein the data network includes an internet.

63. A method of operating a gaming device including a plurality of instructions comprising:

(a) causing at east one processor to execute the plurality of instructions to maintain a predetermined set of symbols;

(b) thereafter, enabling a first player to cause a random generation and a display of at least a first one of the symbols of the set;

(c) enabling a second player to cause a random generation and a display of at least a second one of the symbols of the set;

(d) causing at least one display device to display a progressive award to whichever of the first and second players causes the random generation of a final one of the symbols of the set, said progressive award including at least one value associated with one of the symbols of said set, wherein said at least one value is randomly generated and caused to be displayed after said associated symbol is randomly generated and displayed;

(e) providing the progressive award to whichever of the first and second players causes the random generation of the final one of the symbols of the set; and (f) causing the at least one processor to execute the plurality of instructions to reset the first set so that the first set has no generated symbols after providing the progressive award to said player.

64. The method of claim 63, which includes causing the at least one processor to execute the plurality of instructions to generate the symbols of the first and second sets via play of a base game selected from the group consisting of: a slot game, a poker game, a blackjack game and a keno game.

65. The method of claim 63, which includes providing at least one value associated with the generation of the symbols of the set, wherein the progressive award includes the value.

66. The method of claim 63, which includes enabling the first and second players to each have multiple tries at generating the symbols of the set.

67. The method of claim 63, which includes causing the at least one processor to execute the plurality of instructions to output via the base game the symbols of the set.

68. The method of claim 63, which includes causing the at least one processor to execute the plurality of instructions to output indirectly via the base game the symbols of the set.

69. The method of claim 63, which includes causing the at least one processor to execute the plurality of instructions to form the progressive by assigning an award to the set of symbols.

70. The method of claim 63, which is provided via a data network.

71. The method of claim 70, wherein the data network includes an internet.

72. A method of operating a gaming device including a plurality of instructions comprising:

(a) causing at least one processor to execute the plurality of instructions to maintain a predetermined set of symbols;

(b) thereafter, enabling a player playing a base game to randomly generate an outcome;

(c) causing at least one display device to display said randomly generated outcome, wherein the outcome transforms visually into one of the symbols of the set;

(d) causing the at least one display device to display a progressive award to the player if the player generates each of the symbols of the set, wherein the progressive award includes a value associated with one of the symbols in said set, wherein said value is randomly generated and caused to be displayed after said randomly generated and displayed outcome transforms visually into one of the symbols of the set; and (e) providing the progressive award to the player.

73. The method of claim 72, wherein the outcome transforms visually into a plurality of the symbols of the set.

74. The method of claim 72, wherein the outcome transforms visually and sequentially a plurality of times into a plurality of the symbols of the set.

75. The method of claim 72, which includes causing the at least one processor to execute the plurality of instructions to form the progressive award by assigning an award to the set of symbols.

76. The method of claim 72, which is provided via a data network.

77. The method of claim 76, wherein the data network includes an internet.

78. A method of operating a gaming device including a plurality of instructions, said method comprising:

(a) causing at least one processor to execute the plurality of instructions to maintain a predetermined set of symbols;

(b) thereafter causing the at least one processor to execute the plurality of instructions to randomly generate symbols of the set as a direct outcome of one or a plurality of plays of a base game;

(c) causing at least one display device to maintain a display of each symbol after the symbol has been generated;

(d) causing the at least one display device to display a progressive award to a player when each of the symbols of the set is randomly generated, wherein the progressive award includes at least one value associated with one of the symbols of the set, wherein said at least one value is randomly generated and caused to be displayed after said associated symbol is randomly generated; and (e) providing the progressive award to the player.

79. The method of claim 78, which includes causing the at least one processor to execute the plurality of instructions to form the progressive award by assigning an award to the set of symbols.

80. The method of claim 78, which is provided via a data network.

81. The method of claim 80, wherein the data network includes an internet.

82. A method of operating a gaming device including a plurality of instructions, said method comprising:

(a) causing at least one processor to execute the plurality of instructions to maintain a predetermined set of symbols;

(b) thereafter, causing the at least one processor to execute the plurality of instructions to randomly generate symbols of the set as an indirect outcome of one or a plurality of plays of a base game, wherein an outcome of the base game in turn generates one of the symbols;

(c) causing at least one display device to display said randomly generated symbols;

(d) causing the at least one display device to display a progressive award to a player when each of the symbols of the set is randomly generated, wherein the progressive award includes a value associated with one of the symbols of the set, wherein said value is randomly generated and caused to be displayed after said associated symbol is randomly generated and displayed; and (e) providing the progressive award to the player.

83. The method of claim 82, which includes causing the at least one processor to execute the plurality of instructions to form the progressive award by assigning an award to the set of symbols.

84. The method of claim 82, which includes causing the at least one processor to execute the plurality of instructions to form the progressive award based on at least one value generated in association with the generation of one of the symbols.

85. The method of claim 82, which is provided via a data network.

86. The method of claim 85, wherein the data network includes an internet.

87. A method of operating a gaming device including a plurality of instructions, said method comprising:

(a) causing at least one processor to execute the plurality of instructions to maintain a predetermined set of symbols;

(b) thereafter, causing the at east one processor to execute the plurality of instructions to randomly venerate symbols of the set as an outcome of one or more plays of a base game;

(c) causing at least one display device to maintain a display of each symbol after the symbol has been generated;

(d) causing the at least one display device to display a progressive award to a player when each of the symbols of the set is randomly generated, said progressive award determined based on a combination of the symbols of the set and including a r value associated with at least one of the symbols of the set, wherein said value is randomly generated and caused to be displayed after said associated symbol is randomly generated; and (e) providing the progressive award to the player.

88. The method of claim 87, which includes causing the at least one processor to execute the plurality of instructions to assign the progressive award based on a paytable for a game of poker, wherein the symbols are playing cards and the set of symbols is a hand of cards.

89. The method of claim 87, which is provided via a data network.

90. The method of claim 89, wherein the data network includes an internet.

91. A method of operating a gaming device including a plurality of instructions, said method comprising the steps of:

(a) causing at least one processor to execute the plurality of instructions to maintain first and second predetermined sets of symbols;

(b) thereafter, causing the at least one processor to execute the plurality of instructions to randomly generate symbols of the sets as an outcome of one or a plurality of plays of a base game;

(c) causing at least one display device to maintain a display of each symbol after the symbol has been generated; and (d) providing a progressive award to a player when each of the symbols of the first or second sets is generated, whichever is generated first, wherein the progressive award includes a value associated with one of the symbols of the first generated set, wherein said value is randomly generated and caused to be displayed after said associated symbol of the first generated set is randomly generated.

92. The method of claim 91, which includes causing the at least one processor to execute the plurality of instructions to form the progressive award by assigning an award to the first and second sets of symbols.

93. The method of claim 91, which includes causing the at least one processor to execute the plurality of instructions to form the progressive award based on at least one value generated in association with the generation of one of the symbols of the first or second sets, whichever is generated first.

94. The method of claim 91, which is provided via a data network.

95. The method of claim 94, wherein the data network includes an internet.

96. The method of claim 25, which includes providing the progressive award to the player for the set that is first to have each of its symbols generated.

97. The method of claim 78, which includes causing the at least one processor to execute the plurality of instructions to form the progressive award based on at least one value generated in association with the generation of one of the symbols.

* * * * *

UNITED STATES PATENT AND TRADEMARK OFFICE

CERTIFICATE OF CORRECTION

PATENT NO. : 7,601,060 B2
APPLICATION NO. : 10/463503
DATED : October 13, 2009
INVENTOR(S) : Baerlocher et al.

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 966 days.

Delete “966 days” and insert --1389 days--.

In Claim 87, Column 23, line 59, replace “east” with --least--.

In Claim 87, Column 23, line 60, replace “venerate” with --generate--.

In Claim 87, Column 24, line 7, delete “r”.

Signed and Sealed this

Twenty-seventh Day of July, 2010

David J. Kappos

David J. Kappos
*Director of the United States Patent and Trademark Office*